Feb. 25, 1936. T. CATON 2,032,258
FRUIT CONVEYER
Filed April 16, 1935 2 Sheets-Sheet 2
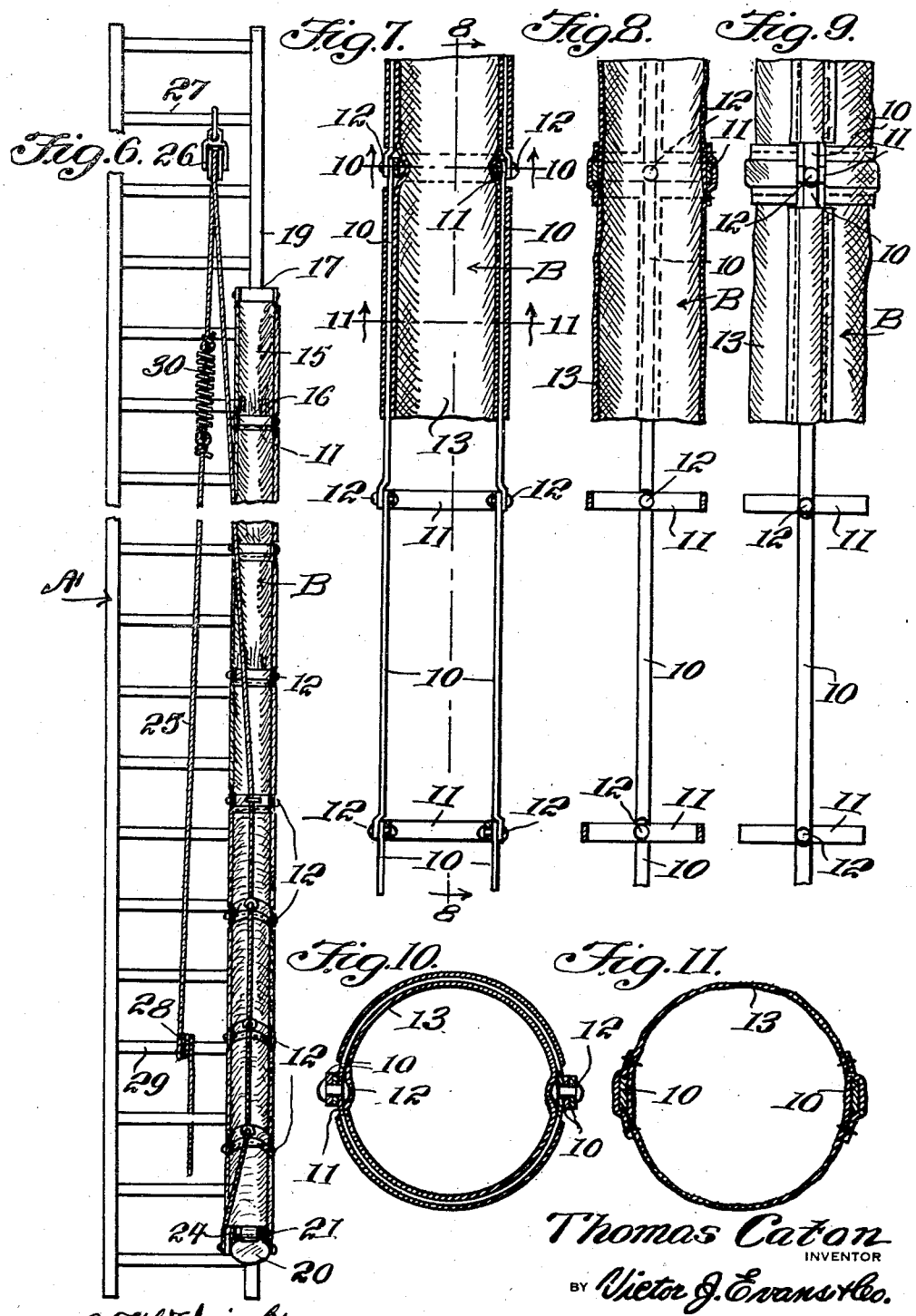
Thomas Caton
INVENTOR
BY Victor J. Evans & Co.
ATTORNEY Patented Feb. 25, 1936

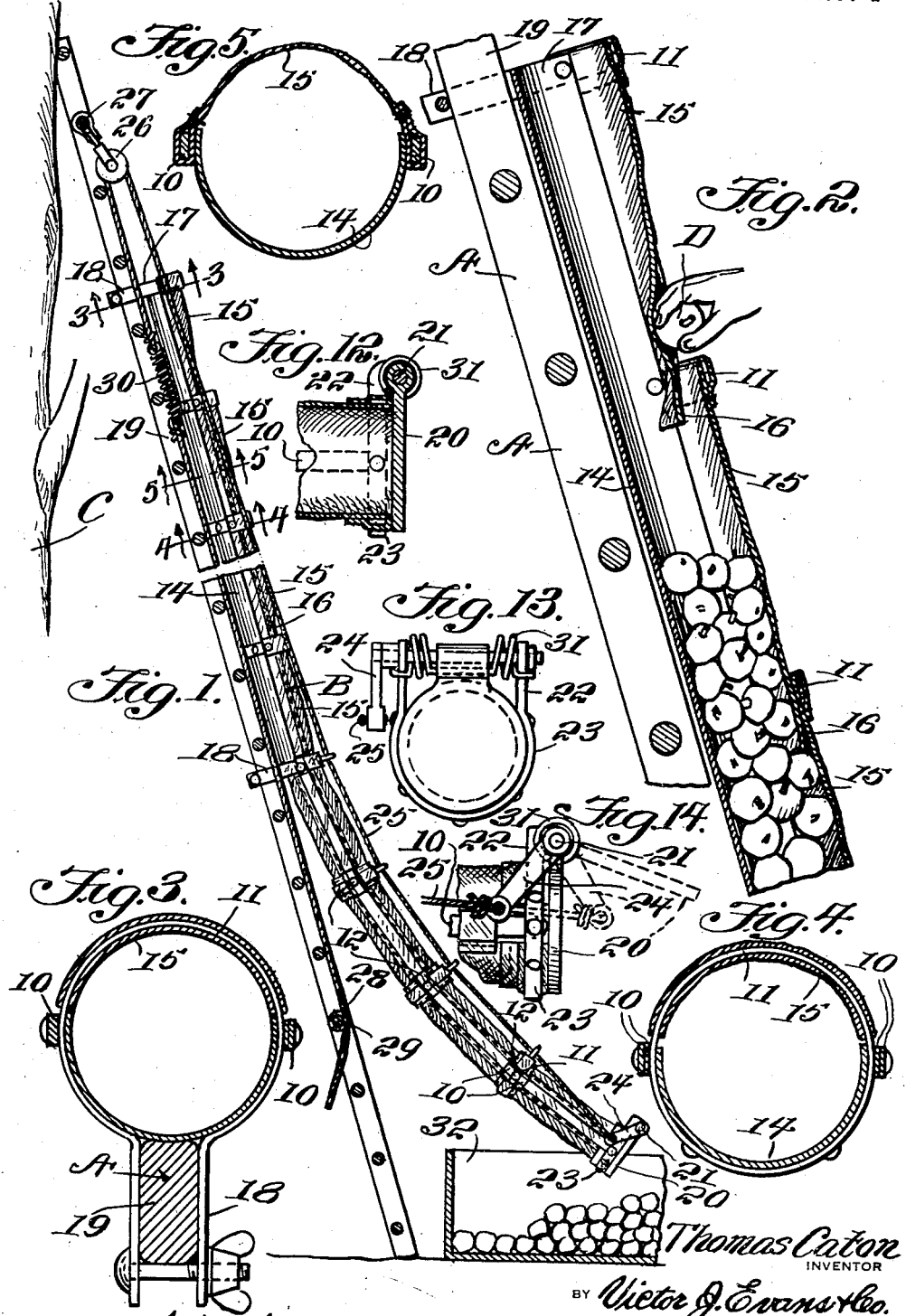

2,032,258

UNITED STATES PATENT OFFICE 2,032,258

FRUIT CONVEYER

Thomas Caton, Millbrook, N. Y.

Application April 16, 1935, Serial No. 16,663

1 Claim. (Cl. 193—7)

The invention relates to a fruit conveyer and more especially to a combined ladder and fruit gatherer.

The primary object of the invention is the provision of a device of this character, wherein a tube or pipe is constructed to permit the introduction or admission of fruit when pulled from a tree, plant or the like growing the same at one or more points removed from the uppermost end of said tube or pipe when the same is carried by a ladder and on its elevation so that a person upon the ladder may conveniently collect or gather the pulled fruit should he or she be standing on a rung out of reach of the upper open end of the tube or pipe and thus avoid the necessity of climbing the ladder to a high point as may be required for access to the upper open end of said tube or pipe and thus assuring ease in the gathering of the fruit and the handling thereof with dispatch.

Another object of the invention is the provision of a device of this character, wherein the tube or pipe serves as a conveyer spout for the feeding of the gathered fruit to a depository or a receiver and the pulled fruit can be dispensed from the tube or pipe at determined or selected intervals and at the will of the user of the device.

A further object of the invention is the provision of a device of this character, wherein the tube or pipe serving as a conveyer or spout for loose gathered fruit is novel in its construction to permit of the easy placing of the pulled fruit within such tube or pipe at points along the uppermost portions of the said tube or pipe or through the upper open end of the same, this affording convenience in the gathering of the fruit and dispatch in the handling of such fruit and also ease in the conveyance of the picked fruit to a point of deposit of the same when an operator is upon a ladder and thus avoiding excessive climbing of the ladder for gathering purposes and demounting therefrom for the deposit by hand of the fruit after gathering of the same, and the fruit when being gathered and dispensed will be relieved of damage, resultant from bruising or otherwise.

A further object of the invention is the provision of a device of this character which is simple in its construction, thoroughly reliable and efficient in its purposes, mountable upon and carried by a ladder, convenient of access and for service in dispensing gathered fruit, strong, durable, and inexpensive to manufacture.

With these and other objects in view, the invention consists in the features of construction, combination and arrangement of parts, as will be hereinafter more fully described in detail, illustrated in the accompanying drawings, which disclose the preferred embodiment of the invention and pointed out in the claim hereunto appended.

In the accompanying drawings:

Figure 1 is a fragmentary elevation of a fruit tree showing the device related thereto and constructed in accordance with the invention.

Figure 2 is an enlarged fragmentary vertical longitudinal sectional view through the device and showing a fruit being introduced thereinto.

Figure 3 is an enlarged sectional view on the line 3—3 of Figure 1 looking in the direction of the arrows.

Figure 4 is a sectional view on the line 4—4 of Figure 1 looking in the direction of the arrows.

Figure 5 is a sectional view on the line 5—5 of Figure 1 looking in the direction of the arrows.

Figure 6 is a front elevation of the device.

Figure 7 is a fragmentary longitudinal sectional view of the same.

Figure 8 is a sectional view on the line 8—8 of Figure 7 looking in the direction of the arrows and fragmentary.

Figure 9 is a side elevation.

Figure 10 is a sectional view on the line 10—10 of Figure 7 looking in the direction of the arrows.

Figure 11 is a sectional view on the line 11—11 of Figure 7 looking in the direction of the arrows.

Figure 12 is a fragmentary longitudinal sectional view through the dispensing or discharge end of the device.

Figure 13 is a plan view of the dispensing or discharge end.

Figure 14 is a fragmentary enlarged side elevation of this end showing by full lines the gate closed and by dotted lines open.

Similar reference characters indicate corresponding parts throughout the several views in the drawings.

Referring to the drawings in detail, A designates generally a ladder of the rung type and is of the required length serviceable in gathering fruit from a tree, plant or the like to permit the pulling of the fruit therefrom. Mounted upon and carried by the ladder A is a tube or pipe B including a skeleton frame having swinging links 10 and pivotal joint hoops 11, the pivots 12 being for the purpose of connecting the links 10 together and with the hoops 11, and the latter preferably equally distanced from each other throughout the extent of the tube or pipe and the approximate lower half of said tube or pipe has its frame carrying a fabric covering 13 while the remaining upper half of said tube or pipe has its frame carrying half cylindrical sheet metal coverings 14 which are coextensive with the inner halves of the hoops 11 of said frame while the outer halves of said hoops have hung therefrom flexible fabric curtains 15, each having a free lowermost edge 16 which is overlapped by an adjacent hoop 11 as will lie next thereto. This curtain 15 permits the introduction through the skeleton frame at different points along the outer side of the upper half of the tube or pipe B. It is, of course, understood that the upper end 17 of the tube or pipe B is open and fruit pulled from a tree C, plant or the like may be dropped therethrough in the gathering of such fruit. It should be apparent from Figures 1 and 2 of the drawings that pulled fruit as at D may be dropped by hand into the tube or pipe B at selected points along the outer side of the same or through the open upper end 17 thereof.

The upper half of the tube or pipe B is fixedly held by clamps 18 continued from a pair of the hoops 11, preferably the one at the open end 17 and another at the meeting of the upper and lower halves of the tube or pipe and these clamps 18 are detachably secured to one side rail 19 of the ladder A so that the upper half of the tube or pipe B will be held rigid thereon for the extent of said upper half. It is preferable to have this upper half of the tube or pipe B follow the uppermost portion of the ladder A.

The lower open end of the tube or pipe B is normally closed by a gate or closure head 20 swingingly supported by a turning pivot 21 journaled in bearings 22 of a yoke mount 23, the pivot 21 having fixed thereto a throw arm or crank 24 to which is fastened one end of a releasing rope or cable 25 trained through a pulley block 26 hung upon an upper rung 27 of the ladder A and passed over the pulley of said block downwardly of the ladder with its other end wrapped at 28 about a lowermost rung 29 of said ladder. This downwardly extending portion of the rope or cable has included a coiled retractile spring 30 located between the block 26 and the wrapped end 28, the purpose of the spring being to hold the gate or head 20 closed for retaining fruit within the tube or pipe and on the slackening of the rope or cable 25 by relieving the tension of the spring 30 thereon a spring 31 carried by the pivot 21 and working against the gate or head 20 becomes active for the throwing or swinging of the said gate or head 20 to open position for the discharge of the contents of the tube or pipe for the delivery of such contents into a receiver 32 or other depository. The lower half of the tube or pipe B is readily flexible and being free from attachment to the ladder can be bent conveniently for directing the discharge from the tube or pipe directly into the receiver 32.

A person standing upon the ladder is not required to ascend the same for access to the upper open end 17 of the tube or pipe B for the placing of pulled fruit within the latter because such fruit may be dropped into the said tube or pipe at varying points along the outer side of the same confronted by the curtains 15 and on gathering a quantity of fruit within the tube or pipe B such person need not demount from the ladder for effecting the discharge of the collected fruit as it will be only necessary to open the gate or head 20 and the gathered fruit will discharge by gravity from the tube or pipe into the depository or container 32 as before set forth.

What is claimed is:

In a fruit conveyer, a flexible tube having openings for a distance thereof, a ladder, means fastening the tube with the ladder for the extent of the same having the openings, a swinging gate carried at the lowermost end of the tube, a spring tensioned cable carried by the ladder and connected with the gate for holding the latter closed, and means opening the gate on relieving tension upon said cable.

THOMAS CATON.